US010281608B2

(12) United States Patent
Samworth et al.

(10) Patent No.: US 10,281,608 B2
(45) Date of Patent: May 7, 2019

(54) METHODS OF LOGGING GEOLOGICAL FORMATIONS

(71) Applicant: Reeves Wireline Technologies Limited, Leicestershire (GB)

(72) Inventors: James Roger Samworth, Leicestershire (GB); Rosalind Julia Tabiner, Leicestershire (GB)

(73) Assignee: Reeves Wireline Technologies Limited, Leicestershire (GB)

(*) Notice: Subject to any disclaimer, the term of this patent is extended or adjusted under 35 U.S.C. 154(b) by 601 days.

(21) Appl. No.: 14/645,489

(22) Filed: Mar. 12, 2015

(65) Prior Publication Data
US 2015/0260873 A1 Sep. 17, 2015

(30) Foreign Application Priority Data

Mar. 12, 2014 (GB) .................................. 1404378.0

(51) Int. Cl.
*G01V 3/10* (2006.01)
*G01V 3/38* (2006.01)
*G01V 3/20* (2006.01)
*G01V 3/28* (2006.01)

(52) U.S. Cl.
CPC .................. *G01V 3/38* (2013.01); *G01V 3/10* (2013.01); *G01V 3/20* (2013.01); *G01V 3/28* (2013.01)

(58) Field of Classification Search
None
See application file for complete search history.

(56) References Cited

U.S. PATENT DOCUMENTS

2006/0273792 A1* 12/2006 Kholmovski ...... G01R 33/5611
324/309
2009/0240437 A1* 9/2009 Samworth ................ G01V 3/28
702/11

FOREIGN PATENT DOCUMENTS

GB          2458504 A    9/2009
GB          2464270 A    4/2010

OTHER PUBLICATIONS

Search Report received in corresponding Great Britain application No. GB1404378.0, dated Jul. 15, 2014.
Nelson, R. et al., "Improvied Vertical Resolution of Well Logs by Resolution Matching," SPWLA 31st Annual Logging Symposium, Jun. 24-27, 1990, 25-pgs.

* cited by examiner

Primary Examiner — Tung S Lau
(74) Attorney, Agent, or Firm — Blank Rome LLP

(57) ABSTRACT

A method of improving geological log data obtained from use of one or more logging tools, the method including the steps of (i) from raw log data recorded by the said one or more logging tools, respectively deriving according to differing first and second derivation methods a first log data set and a corresponding second log data set having the same vertical response attribute, (ii) mixing, to form resulting log curves, the first and second log data sets, the extent of mixing varying from one logged depth to another in relation to a function of (a) the semblance between the recorded log data and reference log data of a differing kind from the recorded log data and (b) the activity of one of the said first and second log data sets at each logged depth; and (iii) displaying transmitting, saving, outputting or processing one or more resulting improved log curves.

19 Claims, 10 Drawing Sheets

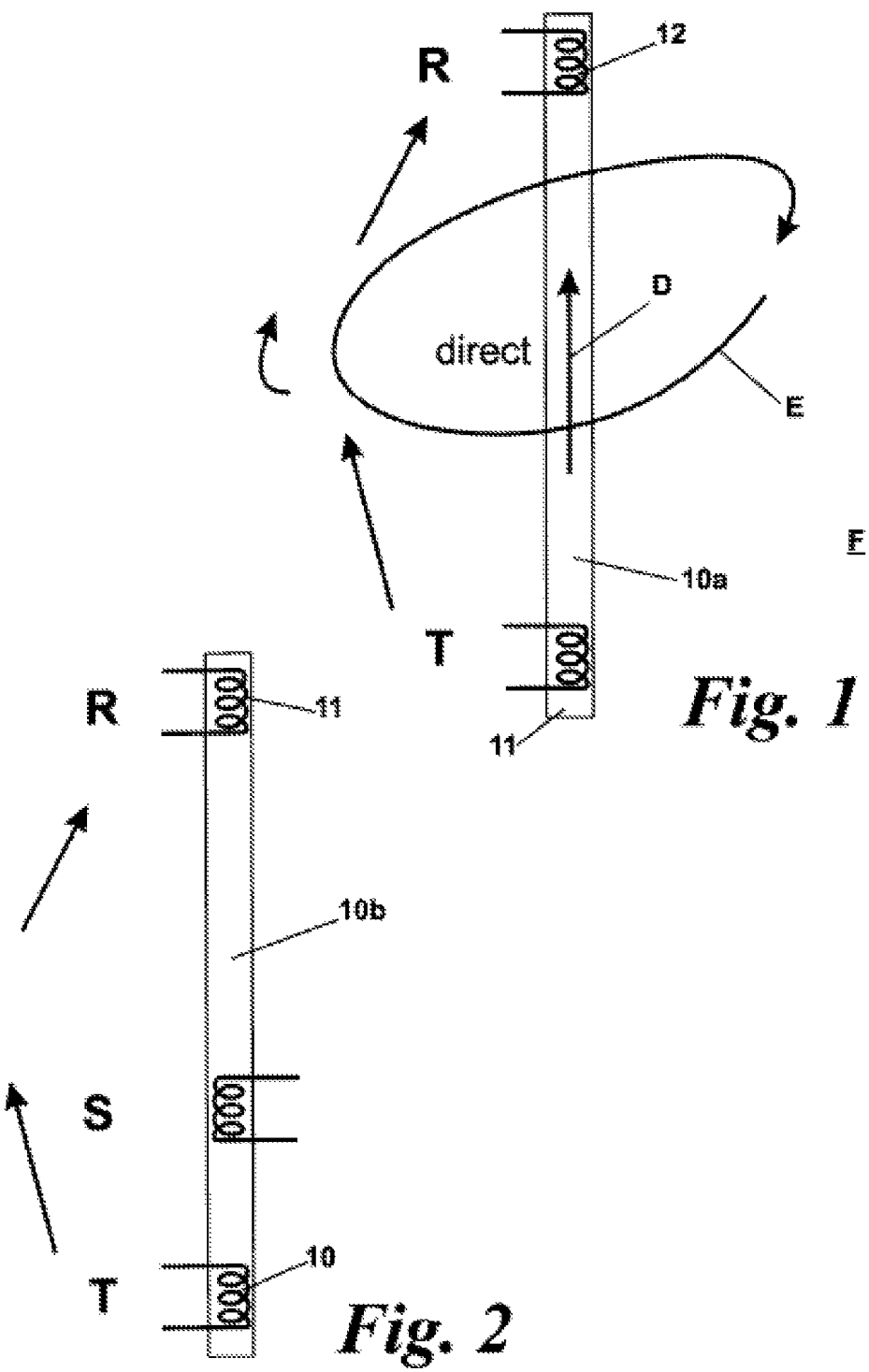

Short log * long response => complementary log
*Fig. 7a*
long log * short response => complementary log
*Fig. 7b*
Complementary filtered short log / short log
*Fig. 7c*
=> 
=> ratio log
Complementary filtered long log / ratio
*Fig. 7d*
=> 
=> long log with short resolution

METHODS OF LOGGING GEOLOGICAL FORMATIONS

FIELD OF THE INVENTION

The invention concerns improvements in or relating to methods of logging geological formations.

BACKGROUND OF THE INVENTION

As is well known, prospecting for minerals of commercial or other value (including but not limited to hydrocarbons in liquid or gaseous form; water e.g. in aquifers; and various solids used e.g. as fuels, ores or in manufacturing) is economically an extremely important activity. For various reasons those wishing to extract such minerals from below the surface of the ground or the floor of an ocean need to acquire as much information as possible about both the potential commercial worth of the minerals in a geological formation and also any difficulties that may arise in the extraction of the minerals to surface locations at which they may be used.

For this reason over many decades techniques of logging of subterranean formations have developed for the purpose of establishing, with as much accuracy as possible, information as outlined above both before mineral extraction activities commence and also, increasingly frequently, while they are taking place.

Broadly stated, logging involves inserting a logging tool including a section sometimes called a "sonde" into a borehole or other feature penetrating a formation under investigation; and using the sonde to energise the material of the rock, etc., surrounding the borehole in some way. The sonde or another tool associated with it that is capable of detecting energy is intended then to receive emitted energy that has passed through the various components in the rock before being recorded by the logging tool.

Such passage of the energy alters its character. Knowledge of the attributes of the emitted energy and that detected after passage through the rock may reveal considerable information about the chemistry, concentration, quantity and a host of other characteristics of minerals in the vicinity of the borehole, as well as geological aspects that influence the ease with which the target mineral material may be extracted to a surface location.

Logging techniques are employed throughout the mining industry, and also in particular in the oil and gas industries. The invention is of benefit in logging activities potentially in all kinds of mining and especially in the logging of reserves of oil and gas.

In the logging of oil, coal and gas fields (including fields combined with rock types such as shales) specific problems can arise. Broadly stated this is because it is necessary to consider a geological formation that typically is porous and that contains a hydrocarbon-containing fluid such as oil or gas or (commonly) a mixture of fluids only one component of which is of commercial value.

This leads to various complications associated with determining physical and chemical attributes of the oil or gas field in question. In consequence a wide variety of logging methods has been developed over the years. The logging techniques exploit physical and chemical properties of a formation usually through the use of a logging tool or sonde that as outlined above is lowered into a borehole (that typically is, but need not be, a wellbore) formed in the formation by drilling.

Typically, as noted, the tool sends energy into the formation and detects the energy returned to it that has been altered in some way by the formation. The nature of any such alteration can be processed into electrical signals that are then used to generate logs (i.e. graphical or tabular representations containing much data about the formation in question).

The borehole usually is several hundreds or thousands of feet in length yet is narrow (being perhaps as narrow as 3 inches (about 76 mm) or less in diameter), although in practice such a borehole is almost never of uniform diameter along its length.

An aim of the invention is to improve the quality of log data obtained using any of several logging tool types.

One particular kind of logging technique that is known as induction logging, makes use of an induction logging tool. The method of the invention defined hereinbelow particularly but not exclusively is suitable when it is necessary to process data obtained using an induction logging tool and/or a resistivity logging tool that in some respects functions analogously to an induction tool. The method also may be used when operating other logging tool types.

During induction logging an induction tool typically is lowered into and subsequently removed from a borehole on a wireline the nature and purpose of which are well known in the logging art. Like most logging tools the induction tool is an elongate cylinder having at spaced intervals along its length various components whose function is to transmit energy (that in the case of the induction tool is electrical energy) through a geological formation and receive (by induction in the case of the induction tool) energy that is indicative of attributes of the formation. The logging tool converts such energy into signals that may be transmitted via the wireline and/or recorded for later use.

Broadly stated an induction tool includes a transmitter that induces current, according to a per se known technique, in the formation surrounding the tool at the depth to which the tool has been lowered. The induction tool also includes one or more (and in practical versions, several) receivers of induced current energy.

FIG. 1 illustrates the operation of a simple form of induction tool 10a.

As is apparent from FIG. 1, a transmitter T shown schematically as a coil 11 induces eddy currents E in the formation F. These travel through the formation that includes the hydrocarbon-bearing fluid under investigation, to be detected by a receiver R also in the form of a coil 12. The receiver coil R couples the eddy currents and is spaced from the transmitter coil T by a distance selected to make the signal at the receiver R preferentially responsive to the eddy currents circulating in a certain range of distances into the geological formation F around the well-bore. The distance in the formation from which half the signal at the receiver originates is commonly assigned as the depth of penetration of the measurement for that receiver.

At the same time as the eddy currents E are transmitted however, direct induction of current in the receiver occurs via a transmission path D constituted by the logging tool itself. Current transmitted via this direct path is referred to herein as primary current.

The phase of the eddy current in the formation and of the primary current directly transmitted to the receiver is shifted 90 degrees with respect to the transmitter current during transmission. The formation eddy current itself induces a further signal in the receiver, phase shifted by a further 90 degrees, making this signal have a phase shift of 180 degrees compared with the transmitter current.

The expression $-\sigma\omega^2 e^{-i\omega wt} + i\omega e^{-\omega wt}$ therefore represents the total current received at the receiver R as a result of the two modes of transmission, with $-\sigma\omega^2 e^{-i\omega t}$ representing the eddy currents and $i\omega e^{-i\omega t}$ the directly-induced current.

The primary current component is undesirable since it contains no information about the geology. Therefore the primary current may be regarded as noise. This noise tends to dominate the signal generated by the receiver R, thereby rendering its output potentially of low or zero value.

In the prior art it has been proposed to filter this noise though the use of a phase detector in the induction logging tool 10a in order to eliminate the effect of the primary induced current. A problem with this approach however is that the (90 degree-shifted) directly coupled, primary current is very significantly larger than the secondary (180 degree-shifted) current. The type of phase detector that is suitable for use in a logging tool frequently is not sufficiently sensitive to allow detection of the secondary current under such circumstances. Therefore the approach of using a phase detector alone to compensate for the undesirable primary current is sub-optimal.

Another approach adopted in the prior art is to employ in the logging tool intermediate the transmitter T and receiver R a secondary coil S (shown in the tool 10b of FIG. 2) whose design (especially in terms of the phasing of its windings) and location are such as to cancel the direct, primary current.

Invasion, as is well known in the art, refers to a situation in which fluid (such as drilling fluid or chemicals added during or after drilling) invades the (porous) formation surrounding the borehole. In the art the invasion is assumed to be of "step" profile, i.e. there is assumed to be an abrupt transition from invaded to non-invaded geology. Although this is not strictly an accurate way of describing invasion, for processing purposes it is usually reckoned to be sufficiently accurate. The term "invasion diameter" is used to indicate the extent of the assumedly circular region of invasion surrounding a borehole.

The resistivity of the invaded zone is different to and often less than the resistivity of the non-invaded zone that surrounds it. In the case of logging the formation using an electrode-based resistivity logging tool that is known in the art the resistances of the well-bore, invaded and non-invaded parts may be considered as being in series and hence as additive. As a result the error contributed by a low resistance invaded zone or by well-bore irregularities is small compared to the resistance of the non-invaded remainder of the formation under investigation, and the overall resistivity value obtained is acceptably accurate.

It is not always possible or desirable to use an electrode-based resistivity tool for the purpose of analyzing a formation by assessing resistance values. An induction tool is often preferred due to its favourable attributes as is known in the art.

A major disadvantage of using such a tool however in invaded formations is that the resistances of the well-bore, invaded and non-invaded regions appear in parallel (since the induced eddy currents pass through these regions simultaneously in passing to the receiver coil). As a result any lower resistivity of the invaded region contributes a very significant error to the overall measured resistivity. Indeed the eddy current induced through the invaded zone and through the well-bore fluid itself, especially if the well-bore is of an irregular shape, can be comparable to the primary current discussed above, such that the log produced under such circumstances may be unusable. This is because the contribution by the part of the formation of interest is small compared to the contribution from the invaded zone and the well-bore.

The problems that arise in relation to the assumed invasion profile of a well are exemplary of a range of signal processing difficulties that can arise when using an induction logging tool. The method of the invention is applicable to a range of problems and, indeed, to a range of tool types. One particular type of tool, among others to which the invention pertains, is an induction logging tool.

In order to alleviate the problems of using induction tools in invaded formation zones one arrangement adopted in the prior art involves the inclusion of multiple (e.g. four) receiver coils and corresponding secondary coils in the induction logging tool at different spacings from the transmitter coil T. The outputs of the plural receiver and secondary coils can then be combined according to a subtle algorithm that assigns weighting and sign values to the outputs of the coils so as to cancel the dramatic effects of the resistivity disparities of the invaded, non-invaded and well-bore regions. A tool including multiple coils of this nature is sometimes referred to as an "array tool" or a "multiple array tool". Such tools were first proposed in the 1980's.

An array tool 10c is visible in FIG. 3. In the tool 10c of FIG. 3 there are four secondary coils S1, S2, S3, S4 and four receiver coils R1, R2, R3, R4. The receiver coils R and the secondary coils S are designed and positioned so as to maximize the desired noise cancelling effect.

As is indicated above the induction logging tool is a narrow cylinder, containing a coil array, that typically might be 1.5 meters or more in length. In such a tool 10c as shown in FIG. 3 the receiver coils R are spaced over a significant distance such that the signals from them each relate to different depths of the formation. In addition the multiple secondary coils S are also spaced over part of the length of the tool.

The effect overall of these features is that the so-called "vertical resolution" of an induction logging tool having plural secondary and receiver coils may be unacceptably poor. An aim of the invention therefore is to improve the vertical resolution of such a tool.

In this regard researchers in the art are familiar with the vertical response function, that is characteristic of a particular logging tool. When a logging tool is logged through a well, the log that is produced does not precisely reflect the geology. It is distorted and "blurred" by the tool itself. The property of the tool that does this is known as the tool Vertical Response Function, and can be visualised as the log produced from a single very thin bed as shown in FIG. 4. This Vertical Response Function can be calculated theoretically for each coil pair and a good knowledge of its form is important when resolution matching the measurements from coil pairs of differing spacings. The vertical response function can be used when performing calculations that rely on knowledge of the vertical resolutions of the receiver coils of a logging tool.

The variability of the vertical resolution as determined by the vertical response functions of the coils of a particular tool means that the outputs of differing receivers or detectors in the tool may not be accurately combined since they are not resolution-matched. In particular the vertical resolution of a long-spaced coil is less good than that of a shorter-spaced coil in the same tool.

In the prior art it is known to use the output of the longest-spaced receiver coil (the terms "long-spaced", "short-spaced" and derivatives being known to the worker of skill in the art) as it has the deepest "depth of investigation"

into the formation, but in that case the output signal curves corresponding to the corrections by the other receiver coils are not well resolution-matched. It is then necessary to employ a technique that involves the imposition of the resolution of a short-spaced receiver coil onto such curves in order to improve their matching. Prior art techniques of this kind are computationally cumbersome and are not broadly applicable.

For the avoidance of doubt, the term "depth of investigation" as used herein refers to the extent to which the energy received at a particular receiver coil has emanated outwardly from the sonde into the surrounding rock. As noted a long-spaced receiver coil is associated with a significant depth of investigation but poor vertical resolution; and a short-spaced receiver coil is associated with a lesser depth of investigation and a finer vertical resolution characteristic.

In contrast a "logging depth" is a reference to the location, along the borehole, at which a particular item or set of log data is acquired. Logging depths are conventionally measured in feet or meters. Derivative terms are to be construed in accordance with the foregoing information.

Patent no GB 2458505 B describes techniques for significantly improving the vertical resolutions of logs generated using multiple-receiver logging tools, and especially induction tools, of the kind described above.

According to the invention in a first aspect there is provided a method of improving geological log data obtained from use of one or more logging tools, the method including the steps of (i) from raw log data recorded by the said one or more logging tools, respectively deriving according to differing first and second derivation methods a first log data set and a corresponding second log data set having the same vertical response attribute, (ii) mixing, to form resulting log curves, the first and second log data sets, the extent of mixing varying from one logged depth to another in relation to a function of (a) the semblance between the recorded log data and reference log data of a differing kind from the recorded log data and (b) the activity of one of the said first and second log data sets at each logged depth; and (iii) displaying transmitting, saving, outputting or processing one or more resulting improved log curves.

As is well known in the oil exploration and drilling arts a borehole until it becomes a completed well is typically filled with a fluid known as a "mud" or "drilling mud".

The compositions of such muds vary significantly from one borehole to another, depending on (a) the requirements of drilling and mud engineers as to the effects of the muds and (b) the compositions of materials locally available to form base components of the muds. The muds usually are chemically complex and include various additives the purposes of which are to produce desired performance effects. Broadly speaking however the muds in use may be divided into water-based (WB) and non-conducting (NC) muds. NC muds are sometimes called oil-based muds or OBM's.

Water-based muds are generally regarded as being electrically conductive and hence suitable for the generation of (high-resolution) electrode-based resistivity logs (or the inverse, namely conductivity logs). Non-conducting muds as the name implies are regarded as being non-conducting and hence unsuitable for electrode-based logs and only suitable for generation of induction logs that generally have a poorer vertical resolution.

More generally even if a mud per se has not been added to a borehole some form of liquid is usually present in the borehole. The relative salinity or freshness of such liquid determines whether it is conducting or essentially non-conducting.

When the technique described in GB 2458505 B is used in practice it is necessary for a logging engineer to characterise the log data according to the type of mud in use. Existing log processing software uses different log filtering and enhancement algorithms depending on the type of mud selected.

Notwithstanding the use of one of the two main mud types in a borehole, on occasions the quality of a log may be improved by processing e.g. WB mud-acquired log data as though it has been generated in an NC mud environment, or vice versa. As noted however the logging engineer must select the type of mud at the outset of log processing; and the entire log then is treated as having been generated using one or other of the types of mud.

The benefits of treating particular sets of log data as though they have been generated in a different type of mud than that in which they were in fact created however do not inure to the entirety of a log. On the contrary the extent to which log data may beneficially be thus treated varies very significantly from one location to another in a log.

For a variety of reasons, including a need to process log data as quickly as possible, it is not practical for a logging engineer to switch between the processing algorithm types as processing of a log takes place.

Furthermore the extent to which a given log may be improved through treatment of the log data as though generated in a different mud type than the true mud type varies from one location to another in the log. A human logging engineer is most unlikely to be capable of accurately judging the extent to which any processing algorithms must be thus adjusted.

The method of the invention on the other hand advantageously automates the algorithm adjustment process by modulating the extent to which log data acquired in one type of mud environment is processed as though generated in the other main mud type, through the steps of deriving the first and second log data sets using respective first and second differing derivation methods and then mixing the first and second log data sets to form log curves in accordance with the remainder of the method as defined herein. The processing benefits therefore may arise without any need for judgement or intervention on the part of the logging engineer; and the prior art drawback of having to treat the whole of a log according to exclusively one set of processing algorithms is obviated.

In the manner outlined above the first derivation method may in preferred embodiments of the method of the invention amount to processing of the log data in order to achieve the vertical response characteristics of WB mud and the second derivation method may amount to processing of the log data in order to achieve the vertical response characteristics of NC mud.

To this end preferably the first derivation method causes the first log data set and, when present, the third, fifth and seventh log data sets to adopt a resolution based on a focussed electric log corresponding to the geological log data.

A focused electric log is one generated using a focussed electric electrode-based resistivity logging tool, and the first derivation method therefore preferably produces log curves having a WB mud vertical response characteristic.

Similarly preferably the one or more logging tools generate multiple channels of log data from the induction tool alone; depending on the nature of the log data the method sometimes includes deconvolving log data of a said channel; and the second derivation method causes the second log data set and, when present, the fourth, sixth and eighth log data sets to adopt a resolution based on the induction tool alone.

Thus the second derivation method preferably produces log curves having an NC mud vertical response characteristic.

For the avoidance of doubt the one or more logging tools used to acquire the geological log data between them may include any plural number of signal-generating energy receiver channels (such as but not limited to the receiver coils visible in FIG. 3).

Also for the avoidance of doubt each log data set may include any plural number of log data curves, tables, arrays or other collections of such data.

Preferably the method of the invention includes the steps of (iv) from the raw log data respectively deriving according to the differing first and second derivation methods at least a third log data set and a corresponding fourth log data set, having the same vertical response attribute; (v) mixing, to form resulting log curves, the third and fourth log data sets, the extent of mixing varying from one logged depth to another in relation to a function of (a) the semblance between the recorded log data and reference log data of a differing kind from the recorded log data and (b) the activity of one of the third and fourth log data sets at each logged depth; and (vi) displaying transmitting, saving, outputting or processing one or more resulting improved log curves.

Also preferably the method includes the steps of (vii) from the raw log data respectively deriving according to the differing first and second derivation methods at least a fifth log data set and a corresponding sixth log data set having the same vertical response attribute; (viii) mixing, to form resulting log curves the fifth and sixth log data sets, the extent of mixing varying from one logged depth to another in relation to a function of (a) the semblance between the recorded log data and reference log data of a differing kind from the recorded log data and (b) the activity of one of the fifth and sixth log data sets at each logged depth; and (ix) displaying transmitting, saving, outputting or processing one or more resulting improved log curves.

Further preferably the method includes the steps of (x) from the raw log data respectively deriving according to the differing first and second derivation methods at least a seventh log data set and a corresponding eighth log data set having the same vertical response attribute; (xi) mixing, to form resulting log curves, the seventh and eighth log data sets, the extent of mixing varying from one logged depth to another in relation to a function of (a) the semblance between the recorded log data and reference log data of a differing kind from the recorded log data and (b) the activity of one of the seventh and eighth log data sets at each logged depth; and (xii) displaying transmitting, saving, outputting or processing one or more resulting improved log curves.

The foregoing information relates to the situation of the logging tool(s) having four receiver coils. In the event of the logging tool(s) having more or fewer than four receiver coils giving rise to more or fewer than four data channels, varying even numbers of log data sets may be created. The use of any such numbers of log data sets lies within the scope of the invention as broadly defined herein.

The method thus advantageously is suitable to enable automated, controlled mixing of log data processed in each of two ways (i.e. according to WB mud algorithms and NC mud algorithms respectively) in respect of each of a plurality of logging tool receiver channels. In the particularly preferred embodiment of the invention the logging tool includes four receiver coils as illustrated in FIG. 3 and the method involves processing the output of each coil as a mixture of NC- and WB-derived log data types, the extent of the mixing being determined by the function referred to.

Conveniently when the outputs of four receiver coils are processed the intrinsic vertical resolutions of the seventh and eighth log data sets are less fine than the intrinsic vertical resolutions of the fifth and sixth log data sets, that are less fine than the intrinsic vertical resolutions of the third and fourth log data sets, that are less fine than the intrinsic vertical resolutions of the first and second log data sets. This reflects the typical but non-limiting situation prevailing in a multiple array logging tool such as that illustrated schematically in FIG. 3.

The log data preferably are manipulated so as to simulate spacings of the receiver coils from the transmitter coil that produce vertical resolutions of 1 foot, 2 feet, 4 feet and 6 feet respectively, these being conventionally measured in feet. Other vertical resolutions however may be simulated within the scope of the invention; and moreover it is not necessary that the actual distances of the receiver coils are those that originally produced the 1 foot, 2 foot, 4 foot and 6 foot resolutions. The thus manipulated log data sets are available as NC-derived data sets and WB-derived data sets as explained, giving rise to the eight potentially available data sets specified.

As noted, as used herein the term "data set" includes within its meaning plural sets of log curves, corresponding to different actual (in the raw data) and simulated (in the processed data) receiver coil spacings. Conveniently the first and second log data sets and, when present, the third to eighth log data sets each include at least six curves and the step of mixing the log data sets gives rise to six said improved log curves derived from mixing of each pair of the log data sets.

Conveniently the method additionally includes the step of incorporating into the log one or more characteristics of a ninth log data set without modulation of the extent of incorporation.

The ninth log data set may be a so-called ½ foot water-based log curve generated using a sidewall focussed electric logging tool. Such a log data set would not benefit from mixing with an NC-processed log data set but may nonetheless be used to enhance the qualities of a log, in accordance with the method of the invention, because the intrinsic vertical resolution of the ninth log data set is greater than the intrinsic vertical resolution of the first or second log data set.

Again for the avoidance of doubt the process of the invention can be extended to any number of coil spacings and resolutions and is therefore not limited to the four described.

Conveniently the prevailing mixing parameter of each log data set is calculated in each case through carrying out the steps of, in respect of plural locations in the log,
  a. Calculating the activity of a first curve that is generated using the said first derivation method;
  b. Determining a zeroed coefficient of semblance between the first curve and a second curve that is generated using the said second derivation method;
  c. Multiplying the activity calculated in Step a by the zeroed semblance determined in Step b in order to derive a mixing parameter curve; and
  d. Modifying the mixing parameter curve to give rise to a modified mixing parameter curve the value of which is the value of the said prevailing measure at a plurality of locations in the log.

The inventors have found the foregoing steps to be computationally efficient and simultaneously effective at generating the prevailing activity measure that is an important characteristic of the method of the invention.

Preferably the method includes the step of, e. Using the modified mixing parameter curve to control the extent of mixing in at least Step (ii) of the method according to the invention defined herein.

The mixing parameter therefore determines the extent to which the two types of processed log data sets are mixed together in respect of each resolution in order to give rise to an enhanced log.

Conveniently the Step a of calculating the activity of a first curve that is representative of the log data set generated using the said first derivation method includes dividing the value of the log at a plurality of locations by a filtered version of itself.

This step gives rise to a dimensionless (ratio) activity parameter. When the value of the activity parameter is maximal, and the zeroed semblance is maximal, the mixing parameter as described is also maximal, and the output of the method is a set of log curves having values that are entirely composed of (for example) the value of the first log data set at the logging depth in question; and when the value of the activity parameter is minimal, and the zeroed semblance is minimal, the mixing parameter as described is also minimal, and the result is a set of log curves having values composed entirely of the log data of (for example) the second log data set at the logging depth instantaneously under consideration.

When the value of the mixing parameter is intermediate between minimal and maximal values the output of the method is a set of log curves the values of which at the logging depth in question are mixes of the first and second log data set values, the mixes being in proportion to the value of the mixing parameter.

The value of the activity parameter changes rapidly from place to place in the log, with the result that the degree of mixing of the two log data sets to create the enhanced log also varies automatically from place to place in the log. The degree of enhancement of one type of log data set by another therefore occurs with high accuracy, without any need for operator intervention.

Optional refinements of the Step d of modifying the mixing parameter curve include one or more of the steps of:

f. Constraining the value of the mixing parameter curve to lie within first and second predetermined limits;

g. Adjusting the first and second predetermined limits to be 0 and 1 respectively;

h. If the value of the mixing parameter curve is zero, extending the depth interval in which any zero value is present; and i. Filtering the mixing parameter curve.

The foregoing refinements assure inter alia that the maximal and minimal values of the mixing parameter are zero and 1.

The method also may optionally include the step of filtering the modified log before displaying, transmitting, saving, outputting or processing it.

Preferably the coefficient of zeroed semblance is derived by filtering the first and second curves using a filter that passes a signal in a spatial frequency band that has zero transmission at zero frequency, and then calculating the semblance between the filtered curves.

The invention furthermore resides in a logging tool or logging toolstring including or operatively connected to a programmable device that is programmed to carry out the steps of a method according to the invention as defined hereinabove.

BRIEF DESCRIPTION OF THE DRAWINGS

There now follows a description of preferred embodiments of the invention, by way of non-limiting example, with reference being made to the accompanying drawings in which:

FIG. 1 shows in schematic form a simple form of induction logging tool;

FIG. 2 shows such a tool including a secondary coil S whose purpose is to eliminate the effects of directly coupled, primary currents;

FIGS. 7a-7d illustrate in schematic form one exemplary embodiment of a resolution (or other attribute) enhancement method known in the prior art;

DETAILED DESCRIPTION OF THE DRAWINGS

Figure 3:
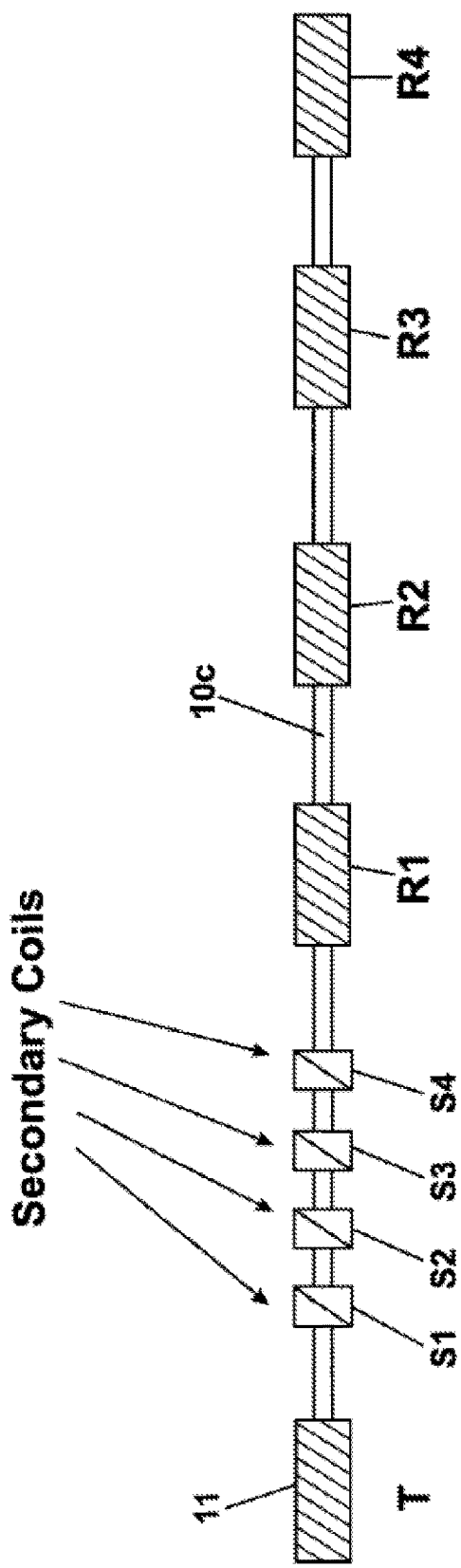
FIG. 3 shows an array induction logging tool.
Figure 6:
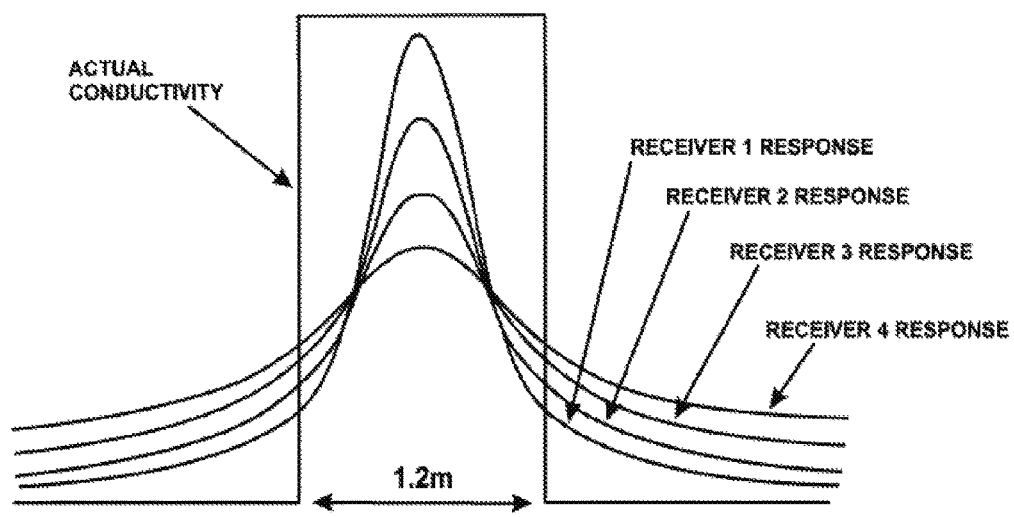
FIG. 6 is a plot illustrating some vertical resolution problems that can derive from use of the array type of induction logging tool.

As best illustrated in FIG. 6 the use in an array tool 10c (FIG. 3) of plural receivers R1, R2, R3, R4 coupling induced currents generated by a transmitter T that are modified by respective secondary coils S1, S2, S3 & S4 results in a corresponding plurality of conductivity logs that are not resolution-matched. This is explained schematically in FIG. 6, that plots the response functions (labelled, respectively, "Receiver 1 Response", "Receiver 2 Response" and so on) of each of the receivers R1, R2, R3, R4. In FIG. 6 each of the response functions is of differing shape than its neighbour. Additionally, the depth into the formation at which each log produced by a respective receiver R1, R2, R3, R4 attains a given conductivity value is not the same either.

FIG. 6 shows in a thick solid line (labelled "actual conductivity") the assumed conductivity of the geological formation penetrated by a well. This figure illustrates that the differences in vertical resolution of the different receivers of the tool can have a pronounced effect on the accuracy of the resultant log.

As explained it is desirable to improve and match the vertical resolution of a plurality of log curves. This can be achieved by a technique of imposing the resolution of a log having a good vertical resolution characteristic on another log have a poorer such characteristic.

Such a technique is known per se but as mentioned a problem with it is that if the logs in question are each measuring different parts of the formation the imposition technique can give inaccurate results.

Considering a pair of logs (i.e. short and long logs derived respectively from short- and long-spaced coils of e.g. an induction tool) of differing vertical resolution attributes, since each log can be considered to be a convolution of its vertical response with the geology:

(Short response)*(geology)=(Short log)

(Long response)*(geology)=(Long log)

If, then, the short log data are convolved with the long log's response function, and the long log data are convolved with the short log's response function, the result is:

(Short log)*(long response)=(Short response)*(geology)*(long response)

(Long log)*(short response)=(Long response)*(geology)*(short response)

Since convolution is a commutative process, the right hand sides of these equations are identical, i.e. there exists a perfect resolution match between resulting short and long logs that have each been filtered by the response of the detector/receiver that is responsible for generating the other.

This is best illustrated by FIGS. 7a and 7b. These show that following convolution as explained above the two complementarily filtered logs are identical. In FIG. 7a there is shown at the right hand side the short log filtered in this fashion; and in FIG. 7b the long log following such filtering.

Further as shown in FIG. 7c if one divides the filtered short log of FIG. 7a by the short log itself the result is a ratio log. The complementary filtered long log of FIG. 7b may then be divided by this log as shown in FIG. 7d. The result of this process is a log that contains the geological information of the long log while having the resolution attribute of the short log. This is a key aim of the invention described in GB 2458505 B.

Figure 4:
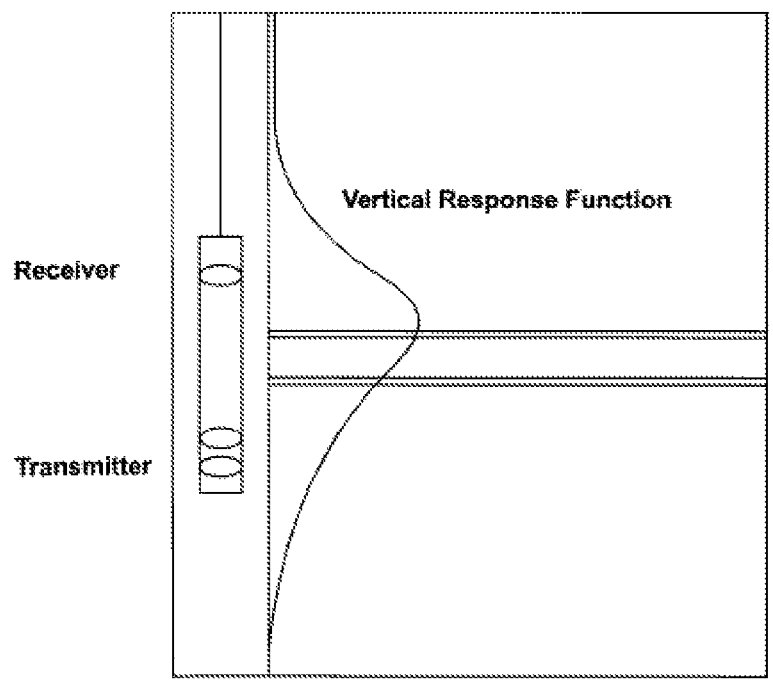
FIG. 4 is a schematic illustration of a typical tool vertical response function.
Figure 5:
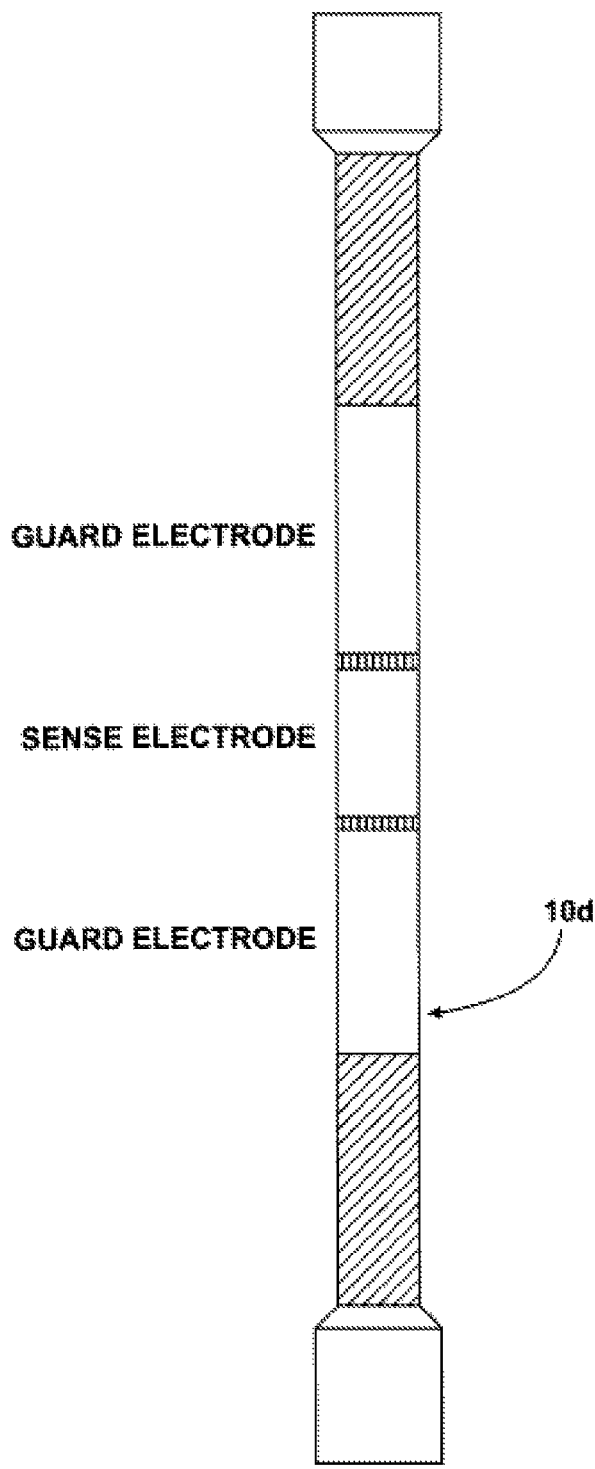
FIG. 5 shows an electrode-type resistivity tool.

The foregoing techniques furthermore are applicable in respect of logs produced by e.g. a resistivity logging tool an example 10*d* of which is illustrated in schematic form in FIG. 5. The features of such a tool will be well known to the worker of skill in the art and need not be described in detail herein. It is however important to note that as in the case of induction tools a resistivity tool need not adopt the cylindrical shape shown in FIG. 4 and may employ any of a range of configurations and operating principles. The method of the invention of GB 2458505 B is applicable using a variety of such tools.

The inventors however have realised that further improvements to the technique described therein can be brought about through the method of the invention.

In particular in practical use of the method of GB 2458505 B it is necessary at the outset of processing of a log data set to determine whether it should be treated as having been created using a WB mud or an NC mud, and apply parameters in the convolution algorithm that are relevant to the mud type chosen.

The inventors have found however that at times one may obtain better quality logs if WB mud-created log data are treated as though they have the vertical resolution of an NC mud system, and vice-versa.

A difficulty with this realisation however is that the extent to which the resulting benefit arises varies from place to place in a log. Moreover the requirement to process logs at the kinds of speeds attainable using computers means that a human could not as a practical matter adjust the extent to which it is necessary to treat log data as having been created using a mud system type other than the actual system present in a borehole.

The method of the invention therefore seeks to take advantage of the realisation that varying the manner in which log data are processed as outlined above is beneficial, while automating the process for achieving this and permitting it to take place at speeds appropriate to computer processing of the data.

Figure 8:
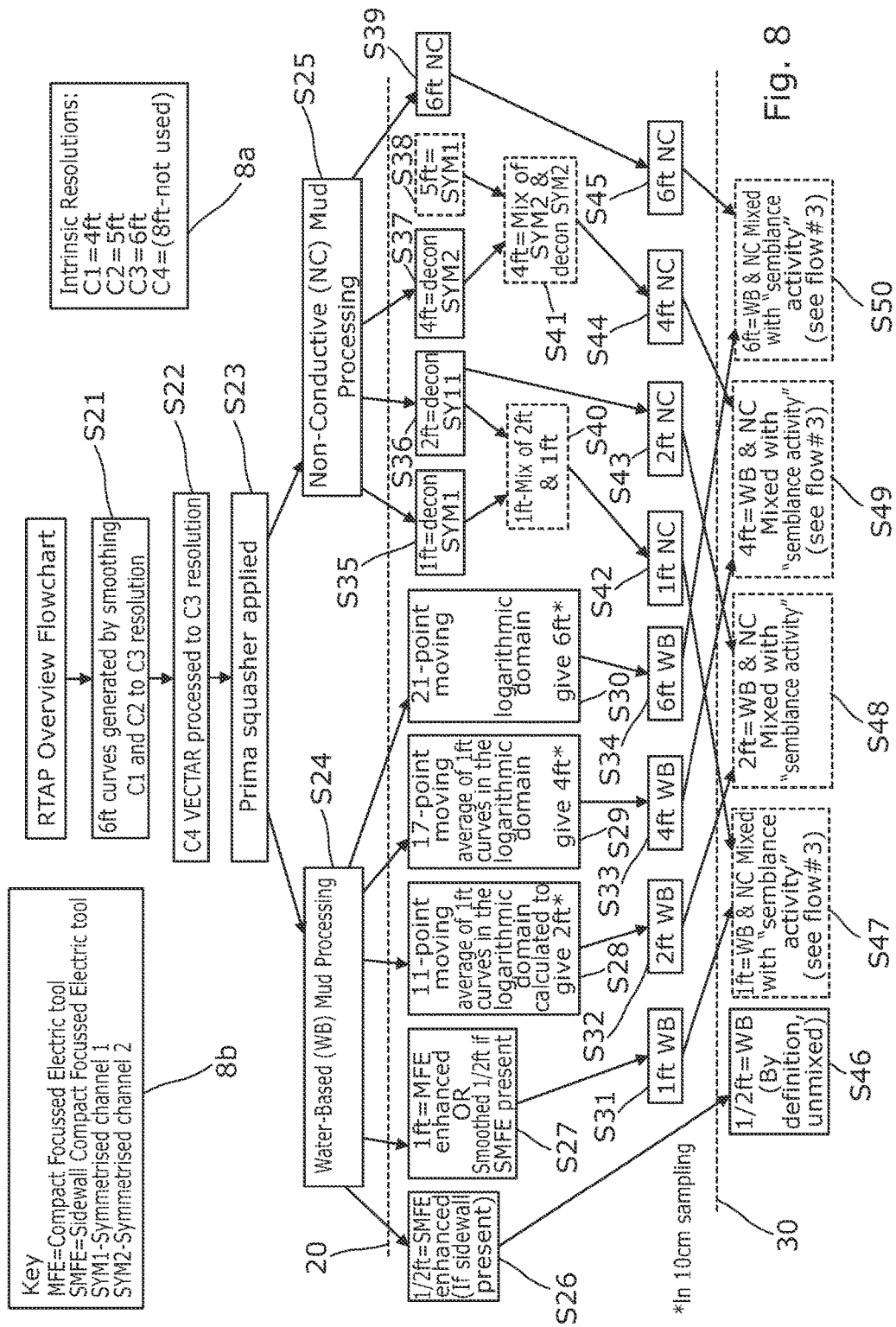
FIG. 8 is a flowchart illustrating the principles of one aspect of the invention.
Figure 9:
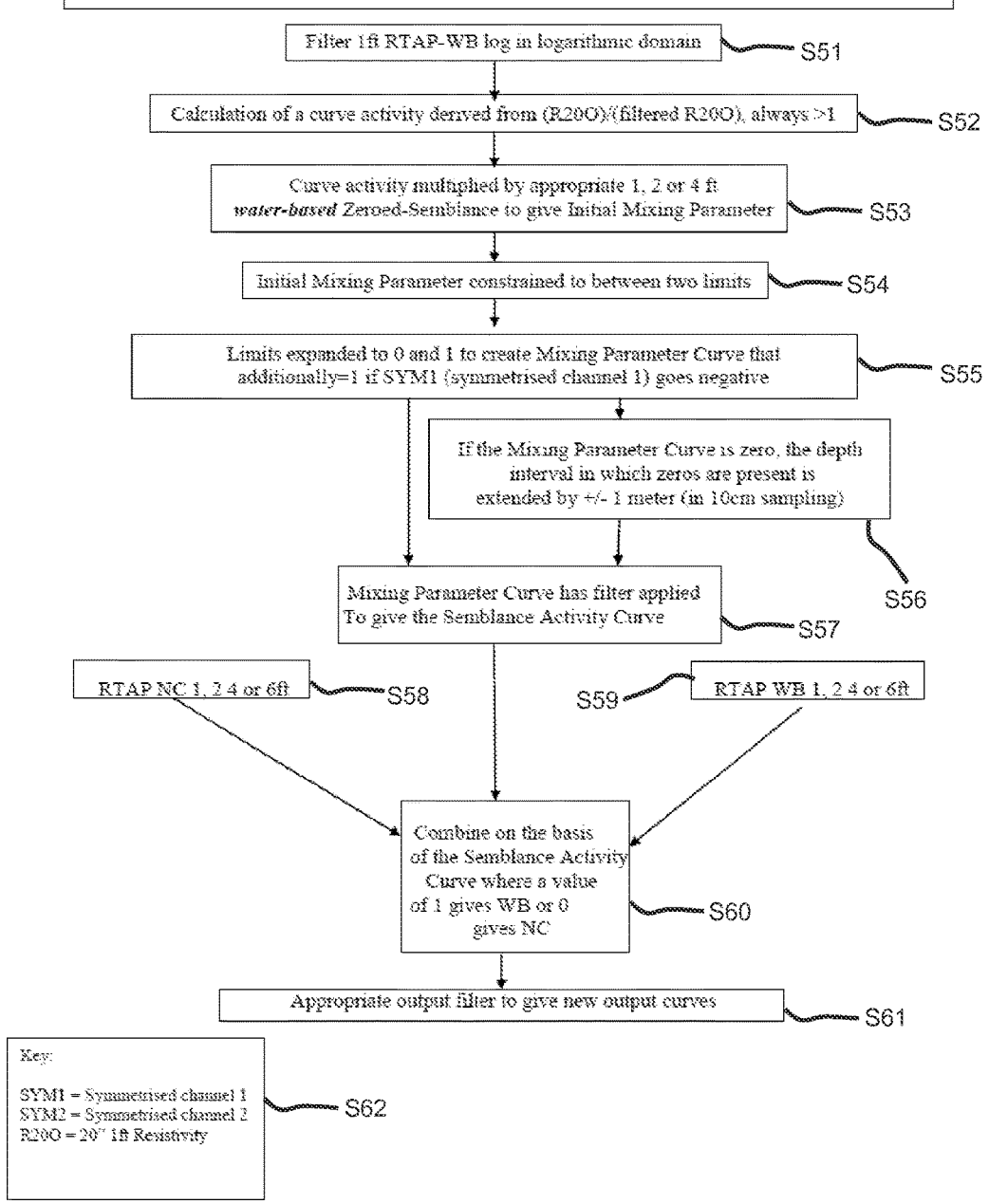
FIG. 9 is a further flowchart illustrating some of the detail of the FIG. 7 process.

The steps in the process of the method are illustrated in FIGS. 8 and 9, which are flowcharts showing the principal steps of the method. FIG. 8 gives an overview of the process and FIG. 9 shows in detail some exemplary processing steps that, when used with different parameters, may be employed at various times during practising of the method.

In FIG. 8 the process steps appearing above the dotted line 20 are disclosed and claimed in GB 2458505 B; and those appearing between dotted lines 20 and 30 represent refinements of the method of GB 2458505 B that are not specifically claimed herein.

At Step S21 the log data curves represented by Channels C1 and C2, being 4 ft and 5 ft resolution curves forming part of a set the resolutions of which are summarised in Box 8*a*, are smoothed using a per se known technique to have the resolution of the C3 (6 ft resolution) curve.

Box 8*b* identifies the notation used to indicate the log curves generated from the respective logging tools used. Thus in box S35, described below, "1 ft—decon SYM1" signifies that the 1 ft resolution curves processed in that step of the method are deconvolved, symmetrised Channel 1 data; in (for example) box S37 "4 ft—decon—SYM2" signifies that the 4 ft resolution curves are deconvolved, symmetrised Channel 2 data, and so on. Further information on the nature and significance of the method steps represented by the various labelled boxes of FIG. 8 is explained below. The deconvolution algorithms may vary from one part of the method to another.

The method of the invention however is not limited to processing of the specific log data types indicated in respect of the various channels in FIG. 8, and on the contrary considerable variation of the exact mix of log channels is possible.

At Step S22 in the embodiment of the method described the C4 (8 ft resolution) channel curve is processed using a known process commercially offered by Weatherford International and known as VECTAR also to acquire the resolution of the C3 curve mentioned in Step S21.

The VECTAR technique represents one of several ways in which curve resolution may be matched. The invention is not limited to use specifically of the VECTAR technique.

At Step S23 an initial suppression routine (the "primary squasher") is invoked which reduces the susceptibility of the raw data to any anomalous values. After the suppression routine has been applied, two versions of the sets of original log data are generated, being those processed using WB mud parameters and those processed using NC mud parameters, as indicated at Steps S24 and S25.

The functions applied in the WB processing step at Step S24 are as summarised in Boxes S26, S27, S28, S29 and S30. The outputs of operation of these functions are indicated in Boxes S26, S31, S32, S33 and S34 respectively as ½ ft=WB, 1 ft WB, 2 ft WB, 4 ft WB and 6 ft WB to signify the resolutions and the use of an operation performed using some parameters acquired from the water-based mud processing output in order to generate the outputs. The 1 ft WB channel is that derived using a so-called Compact Focussed Electric logging tool with which part of the log data were obtained. In this regard the log channels of FIG. 8 relate to processing of the signals and data generated by a particular combination of tool elements. The principles of the invention as defined herein however are equally applicable when combinations of tool elements other than the specific ones indicated in FIG. 8 are employed.

Similarly the functions relating to processing of the log data using non-conducting mud parameters are visible at Steps S35, S36, S37, S38, S39. S40 and S41. From these it will be apparent (from use of the term "decon") that the 1 ft, 2 ft and 4 ft channel data are derived using deconvolved data as part of the processing in accordance with non-conducting mud parameters. Furthermore the 1 ft and 2 ft channel data are mixed (Step S40) according to a further algorithm in order to produce the 1 ft NC output represented in Box S42; the 2 ft deconvolved data are additionally used unmixed as the 2 ft NC output (Box S43); the 4 ft deconvolved and 5 ft convolved channel data are mixed (Box S41) to create the 4 ft NC output (Box S44) and the 6 ft NC convolved data are used unmixed as the 6 ft NC output represented in Box S45.

Boxes S40 and S41 represent the optional generation of mixes of data when the data on which they are intended to be based are sub-optimal.

In this regard it is known for example for the 1 ft resolution data occasionally to be unreliable due to adverse well-bore conditions. When this occurs an acceptable data set that as denoted by box S40 is a mix of the 1 ft and 2 ft deconvolved, symmetrised Channel 1 data may be substituted for the "pure" (but sub-optimal) 1 ft deconvolved, symmetrised Channel 1 data represented in box S35.

This use of the 2 ft deconvolved, symmetrised Channel 1 data to substitute for sub-optimal 1 ft resolution data is, as signified by box S43 and the arrow notation in FIG. 8, additional to use of the 2 ft resolution data of box S36 in its own right Similarly the 4 ft resolution log data of box S37 may be sub-optimal and may be substituted by a mix as indicated at box S41 of the 4 ft resolution, deconvolved, symmetrised Channel 2 data and the 5 ft resolution, deconvolved, symmetrised Channel 2 data.

"Symmetrising" of log data is a technique known to those skilled in the art of log processing mathematics.

Each of boxes S26-S41 represents a plurality of log curves each having a differing measurement penetration. In the preferred exemplary embodiment seven curves are represented by each of the boxes S26-S41. Six of these are processed further in the remainder of the method of the invention and one (having the response characteristic of the raw data) is not processed further in each case.

It should however be appreciated that almost any number of log curves, having respectively differing measurement penetrations, could at this stage of the method be produced as represented by boxes S26-S41.

It will be appreciated in view of the foregoing that not every one of the method steps represented by boxes S35, S40, S37 and S41 necessarily will be used each time the method of the invention is practised.

In accordance with a key aspect of the invention as noted the outputs represented in Boxes S26, S31, S32, S33, S34, S42, S43, S44 and S45 contribute to a final enhanced log output by mixing in various proportions in accordance with an algorithm as defined herein.

As is apparent from FIG. 8 the output of Step S26 (i.e. the ½ ft WB log data) are used (Box S46) unmixed, hence the notation indicating that the ½ ft resolution channel equals the resolution derived from a sidewall compact focussed electric tool that forms part of the logging toolstring with which the log data represented in FIG. 8 was acquired. The remainders of the outputs of the processing functions are mixed as indicated in FIG. 8, in proportions determined by the method steps as set out and defined herein.

Thus Box S47 represents a mixture of the outputs at Boxes S31 (1 ft WB) and S42 (1 ft NC) with the amount of each of these versions of the log data varying in dependence on the method of the invention; Box S48 similarly signifies a mix of the 2 ft WB and 2 ft NC data sets, again with the proportions determined by the method of the invention; Box S49 represents a similar mix of the 4 ft WB and NC log data sets; and Box S50 a similar mix of the 6 ft WB and NC channels following enhancement as described herein.

The extent to which the respective pairs of first and second log data sets are mixed to create the outputs represented by Boxes S47, S48, S49 and S50 is, as set out above, determined automatically according to the extent to which such mixing is desirable in order to produce enhanced sets of log data amounting to an optimal mix of the two data types in each case. The mixing algorithm according to the invention that is applied in order to create the outputs at Boxes S47, S48, S49 and S50 is shown in FIG. 9.

In FIG. 9 the acronym "RTAP" is used to signify the outputs at the levels of Boxes S31-S45 of FIG. 8. As shown at Box S51 the RTAP 1 ft log data signals are filtered in the logarithmic domain and the result of this process converted to a measure of the relative activity of the two data sets undergoing processing at Step S52 by dividing the R20O channel data by a filtered version of itself. As noted at the key Box S62 of FIG. 9 R20O is the so-called 20" 1 ft resistivity measure obtained using a resistivity sonde in the logging toolstring in addition to the induction tool. In this case the 20" measurement refers to the logging depths of investigation at which samples are taken.

This measure of relative activity is multiplied as appropriate by the 1 ft, 2 ft or 4 ft water-based zeroed semblance. The result of this step as noted at Box S53 is a so-called "Initial Mixing Parameter" that in essence in subsequent processing of the two data sets determines the extent to which the water-based and non-conducting versions of the data contribute to the overall output at each of Boxes S47, S48, S49 and S50.

The concept of zeroed semblance is discussed in more detail below with reference to FIGS. 10a to 10f.

At Step S54 the mixing parameter derived as explained above is constrained to lie within two limits that at Step S55 are expanded to give 0 and 1 as the limits of the value of the mixing parameter such that at a value of 0 the output is entirely constituted by the second derivation method (NC version of the data set); at a value of 1 the output is entirely constituted by the first derivation method (WB version of the data set); and at intermediate values the extent of mixing of the respective data sets is in proportion to the value of the mixing parameter.

As noted at Steps S55 and S56 certain processing conditions are applied to the value of the mixing function to take account of situations in which the raw data becomes negative (Step S55) or the mixing function has a zero value (Step S56).

The mixing function is filtered (Step S57) and then used to determine the extent of combination of the pairs of log data sets (i.e. the RTAP-processed 1 ft WB- and NC-based log data sets, 2 ft WB- and NC-based log data sets, the 4 ft WB- and NC-based log data sets and the 6 ft WB- and NC-based log data sets respectively), as represented at Steps S58, S59 and S60.

The output of this process is filtered (Step S61) in order to give enhanced output curves.

The concept and benefits of a zeroed semblance technique are explained with reference to FIGS. 10a to 10f hereof.

FIGS. 10a, 10b, 10c and 10d show four logs that may be any of a range of types of log (and that are shown as induction logs for illustrative purposes only) in schematic form. As is evident FIG. 10b ("Curve 2") shows the same curve as FIG. 10a ("Curve 1") except that the curve is shifted.

Figure 10A:
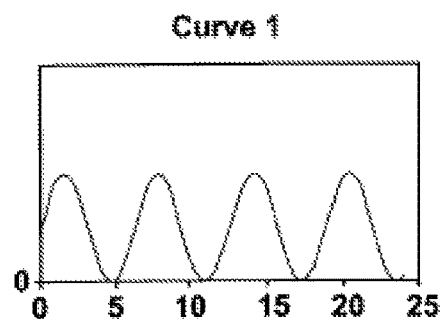
FIGS. 10a to 10f illustrate in schematic form a technique for further modulating the enhancement of the characteristics of a log, based on establishment of a zeroed coefficient of semblance between to curves representing log data.
Figure 10B:
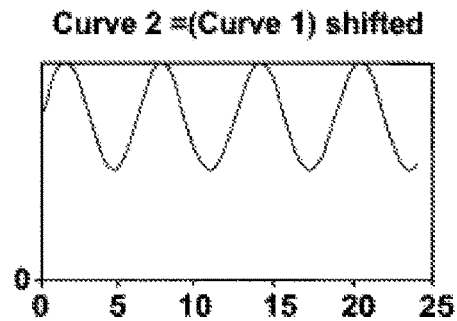
Figure 10C:
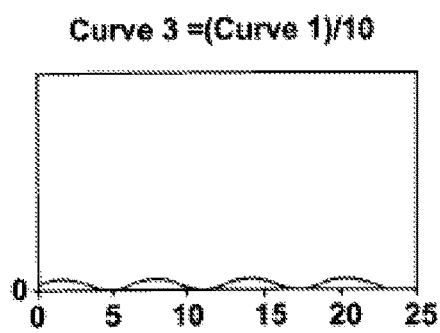
Figure 10D:
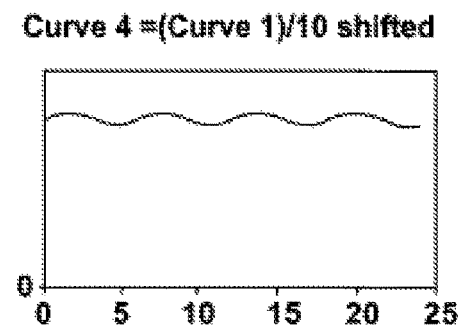

"Curve 3" of FIG. 10c is not the same curve as Curve 1 since its amplitude is different. "Curve 4" of FIG. 10d is Curve 3 shifted in a similar manner to Curve 2.

The correlation of all four curves is perfect since this is a function that is sensitive only to the shape of a curve, and not to amplitude or shift. This function therefore is of no help in ensuring that the curves are all measuring the same part, and therefore properties, of the formation. In other words even though the curves plainly have different sensitivities and measure different parts of the formation an attribute imposition technique based on correlation would not eliminate the erroneous results indicated above as being undesirable.

Semblance on the other hand is a function that is sensitive to the absolute amplitude.

The semblance between all the curves is poor. None of the curves has the same absolute amplitude value, at a given point on the x-axis, as any of the others. Therefore it would not be possible to use semblance as a means of establishing whether any two of the curves relate to the same part of the formation when seeking to impose a high resolution attribute of one of them on another that is of lower resolution.

If however the curves are filtered using a filter that "zeroes" them, i.e. that filters two of the said logs using a filter that passes a signal in a spatial frequency band that has zero transmission at zero frequency, the semblance is improved.

Figure 10E:
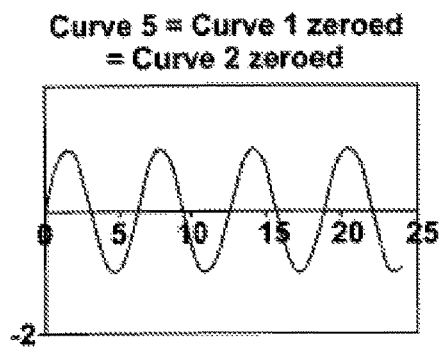
Figure 10F:
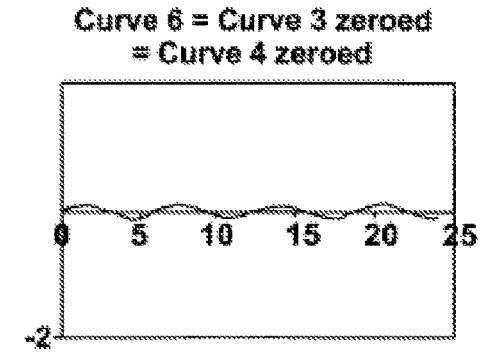

FIGS. 10e and 10f show the effects of filtering ("Curve 5", FIG. 10e) Curves 1 and 2 on the one hand and ("Curve 6", FIG. 10f) Curves 3 and 4 on the other using such a zeroing filter. As illustrated in each case this makes the curves of the same amplitude the same as one another by eliminating the effect of the shift referred to above.

Following such filtering the semblance of Curves 1 and 2 is perfect. The semblance of curves 3 and 4 is also perfect; but the semblance of Curves 5 and 6 is poor, implying that following filtering Curve 1 may be used to influence the resolution of Curve 2 and vice versa but neither of Curves 3 or 4 may be so used. The converse is also true.

It follows that through using a zeroing filter in this way an "automatic" filtering technique arises since the logs that the curves represent are brought into vertical alignment and then the semblance value indicates either a good or a poor extent to which one curve of a pair may be used to influence the other. Such a filter therefore conveniently may be employed in order to limit the extent to which the method of the invention imposes a good log attribute on a log that exhibits the said log attribute only poorly. The method can be employed e.g. only when the "zeroed semblance" value attains a predetermined value, or lies within a predetermined range of values. In this way operation of the method of the invention may be made "self-regulating".

The filter may be embodied in software or may be hard wired, depending on the precise apparatus used to process the log data. The filter may if desired be incorporated into an induction logging tool or may exist e.g. at a surface location.

The technique of filtering as described before establishing the semblance of two curves is referred to herein as the use of a "zeroed semblance" technique. A "zeroed semblance coefficient" is one by which a given log is multiplied in order to give effect to the resolution imposition that is desired.

Figure 11:
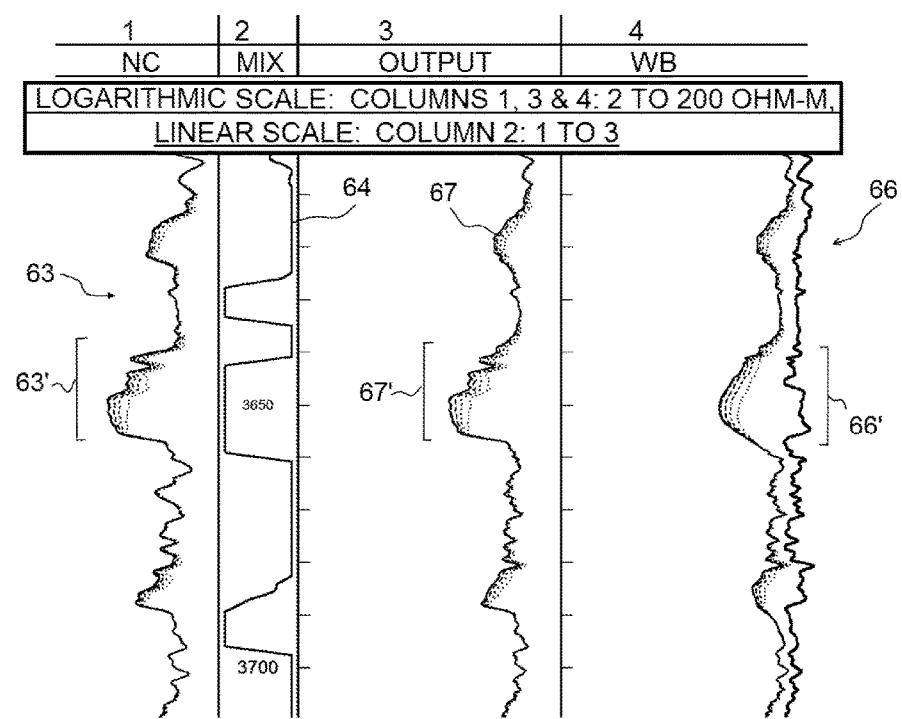
FIG. 11 illustrates the extent to which the vertical resolution of an induction log may be improved using the method of the invention.

FIG. 11 illustrates the extent to which improvements may be achieved using the method and apparatus of the invention.

In FIG. 11 the graphical logs 63 and 66 are, respectively, the NC- and WB-filtered resistivity logs of part of a well produced using the RTAP process mentioned above. The borehole fluid present in the well was water-based with the consequence that using prior art methods and absent the method of the invention the log would have used only water-based log data as represented by log track 66.

Plot 64 shows the variation in the value of the mixing function based on semblance activity as explained herein.

Taking as an example the region 66' of log track 66 the WB-filtered log is not adequately responsive in this region with the result that the detail of changes in the log value cannot be discerned.

In contrast in the corresponding region 63' the responsiveness of the log data is significantly better and considerably more detail is apparent.

In the region of the semblance activity plot 64 corresponding to the logged region 63'/66' the semblance activity between the log tracks 63 and 67 is good according to the criteria set out above. Here the mixing function calculated at Steps S55-S57 described above adopts a value of zero with the result that the mixed log output 67 in the region 67' in question is constituted entirely by the NC log data of track 63 rather than the WB information of log track 66.

At other locations in the log however, as indicated by the shape of the semblance activity (mixing function) plot 64 the mixed log 67 may be made up entirely of the WB log data (when the value of plot 64 is 1) or a blend of the two log data set types depending on the value of the semblance activity measure represented by plot 64. The last-mentioned quantity varies automatically from place to place in the log depending on the extent to which it is beneficial, as determined by the zeroed semblance and activity steps explained above, to mix in the NC-based log data to the WB-resolution data in order to optimise the characteristics of the mixed log 67.

Thus at some locations the resolution of the mixed log 67 is that of the WB log data 66; at other locations it is that of the NC data 63; and at yet further locations it is a resolution value that is intermediate the "pure" WB- and NC log data sets, as determined by the value of the mixing function 64 at each location. Overall the result is a log the resolution of which is better at all locations than the WB log 66 on which it is based, the latter having acceptable vertical resolution characteristics only in some places as noted.

Overall the methods of the invention give rise to significant improvements in logs and log data sets. The invention moreover resides in logs or log data sets produced in accordance with the methods described herein; and also in equipment such as logging tools or sections/parts thereof that produce such logs and/or operate in accordance with the method of the invention. Such tools or part of tools preferably include or are operatively connected (e.g. but not necessarily through the use of wireline the nature of which is known to the person of skill in the art) to one or more programmable devices that is/are programmed to perform the method steps of the invention and/or to produce logs or log data in accordance with the invention.

Although the method of the invention has been illustrated using induction and resistivity log data its principles and techniques are applicable to log data generated in a wide range of other ways as will be known to the person of skill in the art. The invention extends to all such techniques when performed in accordance with principles as defined herein, and to logs, log data and logging tools or parts thereof pertaining to such other log data generation methods and categories.

The listing or discussion of an apparently prior-published document in this specification should not necessarily be taken as an acknowledgement that the document is part of the state of the art or is common general knowledge.

The invention claimed is:

1. A computer-implemented method of prospecting for mineral material in a geological formation penetrated by a borehole, the method comprising:
    obtaining, at a computer, geological conductivity log signals, indicative of the geological formation, received at plural receivers in one or more logging tools at logged depths in the borehole, the plural receivers coupling induced currents generated by a transmitter that are modified by respective secondary coils;
    from the conductivity log signals received at the plural receivers, respectively deriving according to differing first and second derivation methods using the computer a first log signal and a corresponding second log signal having a same vertical response attribute;
    mixing, using the computer, the first and second log signals, an extent of the mixing varying from one of the logged depths to another in relation to a function of
        (a) semblance between the received conductivity log signals and reference log signals of a differing kind from the received conductivity log signals, and
        (b) an activity of one of the first and second log signals at each of the logged depths;
    forming, using the computer, resulting logs from the mixed first and second log signals;
    imaging the geological formation in terms of the geological conductivity by processing, using the computer, one or more of the resulting logs; and
    evaluating extraction of the mineral material from the geological formation based on the imaging.

2. The method according to claim 1, wherein the one or more logging tools include any plural number of signal-generating energy receiver channels.

3. The method according to claim 1, wherein each said log data set includes any plural number of log data curves, arrays or tables.

4. The method according to claim 1, including the steps of
    (iv) from the conductivity log signals, respectively deriving according to the differing first and second derivation methods at least a third log signal and a corresponding fourth log signal, having the same vertical response attribute;
    (v) mixing, to form resulting log signals, the third and fourth log signals, the extent of mixing varying from one logged depth to another in relation to a function of
        (a) the semblance between the conductivity log signals and reference log signals of a differing kind from the conductivity log signals, and
        (b) the activity of one of the third and fourth log signals at each logged depth; and
    wherein imaging comprises processing one or more resulting improved logs.

5. The method according to claim 4, including the steps of
    (vii) from the conductivity log signals respectively deriving according to the differing first and second derivation methods at least a fifth log signal and a corresponding sixth log signal having the same vertical response attribute;
    (viii) mixing, to form resulting log signals, the fifth and sixth log signals, the extent of mixing varying from one logged depth to another in relation to a function of
        (a) the semblance between the conductivity log signals and reference log data of a differing kind from the conductivity log signal and
        (b) the activity of one of the fifth and sixth log signals at each logged depth; and
    wherein imaging comprises processing one or more resulting improved logs.

6. The method according to claim 5, including the steps of
    (x) from the conductivity log signals respectively deriving according to the differing first and second derivation methods at least a seventh log signal and a corresponding eighth log signal having the same vertical response attribute;
    (xi) mixing, to form resulting log signals, the seventh and eighth log signals, the extent of mixing varying from one logged depth to another in relation to a function of
        (a) the semblance between the conductivity log signals and reference log signals of a differing kind from the conductivity log signals, and
        (b) the activity of one of the seventh and eighth log signals at each logged depth; and
    wherein imaging comprises processing one or more resulting improved logs.

7. The method according to claim 1, wherein the first derivation method causes the first log signals and, when present, third, fifth and seventh log signals to adopt a resolution based on a focused electric log corresponding to the geological log data.

8. The method according to claim 1, wherein the one or more logging tools generate multiple channels of log signals from an induction tool alone; wherein the method includes deconvolving log signals of said channel; and wherein the second derivation method causes the second log signals and, when present, fourth, sixth and eighth log signals to adopt a resolution based on that of the induction tool alone.

9. The method according to claim 1, wherein the first and second log signals and, when present, third to eighth log signals each include at least six curves; and wherein the step of mixing the log signals gives rise to six said improved log curves derived from mixing of each pair of the log data sets.

10. The method according to claim 5, including the steps of:
    (x) from the conductivity log signals respectively deriving according to the differing first and second derivation methods at least a seventh log signals and a corresponding eighth log signals having the same vertical response attribute;
    (xi) mixing, to form resulting log signals, the seventh and eighth log signals, the extent of mixing varying from one logged depth to another in relation to a function of
        (a) the semblance between the conductivity log signal and reference log data of a differing kind from the conductivity log signal, and
        (b) the activity of one of the seventh and eighth log signals at each logged depth; and
    wherein imaging comprises processing one or more resulting improved logs; and
    wherein the intrinsic vertical resolutions of the seventh and eighth log signals are less than the intrinsic vertical resolutions of the fifth and sixth log signals, that are less than the intrinsic vertical resolutions of the third and fourth log signals, that are less than the intrinsic vertical resolutions of the first and second log signals.

11. The method according to claim 1, including the step of incorporating into the log one or more characteristics of a ninth log signal without modulation of the extent of incorporation.

12. The method according to claim 1, wherein the one or more logging tools generate multiple channels of log signals from an induction tool alone; wherein the method includes deconvolving log signals of said channel; wherein the second derivation method causes the second log signals and, when present, fourth, sixth and eighth log signals to adopt a resolution based on that of the induction tool alone; and wherein the intrinsic vertical resolution of a ninth log signal is greater than the intrinsic vertical resolution of the first or second log signal.

13. The method according to claim 1, wherein the prevailing measure of the activity of each log signal is calculated through carrying out the steps of, in respect of plural locations in the log,
 a. calculating the activity of a first curve that is generated using the said first derivation method;
 b. determining a zeroed coefficient of semblance between the first curve and a second curve that is generated using the said second derivation method;
 c. multiplying the activity calculated in Step a by the zeroed semblance determined in Step b in order to derive a mixing parameter curve; and
 d. modifying the mixing parameter curve to give rise to a modified mixing parameter curve the value of which is the value of the said prevailing measure at a plurality of locations in the log.

14. The method according to claim 11, wherein the prevailing measure of the activity of each log signal is calculated through carrying out the steps of, in respect of plural locations in the log,
 a. calculating the activity of a first curve that is generated using the said first derivation method;
 b. determining a zeroed coefficient of semblance between the first curve and a second curve that is generated using the said second derivation method;
 c. multiplying the activity calculated in Step a by the zeroed semblance determined in Step b in order to derive a mixing parameter curve; and
 d. modifying the mixing parameter curve to give rise to a modified mixing parameter curve the value of which is the value of the said prevailing measure at a plurality of locations in the log; and further including the step of,
 e. using the modified mixing parameter curve to control the extent of mixing in at least Step (ii).

15. The method according to claim 1, wherein the prevailing measure of the activity of each log signal is calculated through carrying out the steps of, in respect of plural locations in the log,
 a. calculating the activity of a first curve that is generated using the said first derivation method;
 b. determining a zeroed coefficient of semblance between the first curve and a second curve that is generated using the said second derivation method;
 c. multiplying the activity calculated in Step a by the zeroed semblance determined in Step b in order to derive a mixing parameter curve; and
 d. modifying the mixing parameter curve to give rise to a modified mixing parameter curve the value of which is the value of the said prevailing measure at a plurality of locations in the log; and
 wherein the Step a of calculating the activity of a first curve that is generated using the said second derivation method includes dividing the value of the log at a plurality of locations by a filtered version of itself.

16. The method according to claim 1, wherein the prevailing measure of the activity of each log signal is calculated through carrying out the steps of, in respect of plural locations in the log,
 a. calculating the activity of a first curve that is generated using the said first derivation method;
 b. determining a zeroed coefficient of semblance between the first curve and a second curve that is generated using the said second derivation method;
 c. multiplying the activity calculated in Step a by the zeroed semblance determined in Step b in order to derive a mixing parameter curve; and
 d. modifying the mixing parameter curve to give rise to a modified mixing parameter curve the value of which is the value of the said prevailing measure at a plurality of locations in the log; and
 wherein the Step d of modifying the mixing parameter curve includes one or more of the steps of:
  f. constraining the value of the mixing parameter curve to lie within first and second predetermined limits;
  g. adjusting the first and second predetermined limits to be zero and 1 respectively;
  h. if the value of the mixing parameter curve is zero, extending the depth interval in which any zero value is present; and
  i. filtering the mixing parameter curve.

17. The method according to claim 1, including the step of filtering the log before displaying, transmitting, saving, outputting or processing it.

18. The method according to claim 1, wherein the prevailing measure of the activity of each log signal is calculated through carrying out the steps of, in respect of plural locations in the log,
 a. calculating the activity of a first curve that is generated using the said first derivation method;
 b. determining a zeroed coefficient of semblance between the first curve and a second curve that is generated using the said second derivation method;
 c. multiplying the activity calculated in Step a by the zeroed semblance determined in Step b in order to derive a mixing parameter curve; and
 d. modifying the mixing parameter curve to give rise to a modified mixing parameter curve the value of which is the value of the said prevailing measure at a plurality of locations in the log; and
 wherein the coefficient of zeroed semblance is derived by calculating the semblance between the first and second curves that have been filtered using a filter that passes a signal in a spatial frequency band that has zero transmission at zero frequency.

19. A logging tool or logging toolstring including or operatively connected to a programmable device that is programmed to carry out the steps of a method according to claim 1.

* * * * *